(12) United States Patent
Yukawa

(10) Patent No.: US 11,964,587 B2
(45) Date of Patent: Apr. 23, 2024

(54) POWER CONTROL DEVICE AND POWER CONTROL METHOD FOR HYBRID VEHICLE

(71) Applicant: Bosch Corporation, Tokyo (JP)

(72) Inventor: Masashi Yukawa, Kanagawa (JP)

(73) Assignee: Bosch Corporation, Tokyo (JP)

( * ) Notice: Subject to any disclaimer, the term of this patent is extended or adjusted under 35 U.S.C. 154(b) by 724 days.

(21) Appl. No.: 17/261,732

(22) PCT Filed: May 30, 2019

(86) PCT No.: PCT/JP2019/021442
§ 371 (c)(1),
(2) Date: Oct. 19, 2021

(87) PCT Pub. No.: WO2020/017168
PCT Pub. Date: Jan. 23, 2020

(65) Prior Publication Data
US 2022/0048404 A1    Feb. 17, 2022

(30) Foreign Application Priority Data

Jul. 20, 2018    (JP) .................. 2018-136689

(51) Int. Cl.
*H02J 7/00*    (2006.01)
*B60L 50/62*    (2019.01)
(Continued)

(52) U.S. Cl.
CPC .............. *B60L 58/13* (2019.02); *B60L 50/62* (2019.02); *B60L 58/20* (2019.02); *H01M 10/44* (2013.01);
(Continued)

(58) Field of Classification Search
None
See application file for complete search history.

(56) References Cited

U.S. PATENT DOCUMENTS

| | | | |
|---|---|---|---|
| 2007/0139975 A1* | 6/2007 | Yamauchi | H02M 3/33584 363/16 |
| 2010/0187905 A1* | 7/2010 | Tang | B60L 50/52 307/10.1 |
| 2012/0049771 A1* | 3/2012 | Komatsu | B60W 10/28 318/139 |

FOREIGN PATENT DOCUMENTS

| | | |
|---|---|---|
| JP | H11164494 A | 6/1999 |
| JP | 2001333506 A | 11/2001 |

(Continued)

OTHER PUBLICATIONS

Translation of International Search Report for Application No. PCT/JP2019/021442 dated Aug. 20, 2019 (2 pages).

*Primary Examiner* — Arun C Williams
(74) *Attorney, Agent, or Firm* — Michael Best & Friedrich LLP

(57) ABSTRACT

The present invention provides a power control device for a hybrid vehicle that can allow power generation by a generator connected to a low-voltage battery regardless of a charging rate of the low-voltage battery. The hybrid vehicle includes: a motor (21) that can be coupled to a drive wheel (18) of the vehicle; a generator (22) that can be coupled to an internal combustion engine (11); a first secondary battery (21) connected to the motor (21); a second secondary battery (32) that is connected to the generator (22), and a voltage of which is lower than that of the first secondary battery (31); and a converter (33) that steps up a DC voltage received from the second secondary battery (32) and can output the stepped-up DC voltage to the first secondary battery (31).

5 Claims, 2 Drawing Sheets

(51) Int. Cl.
*B60L 58/13* (2019.01)
*B60L 58/20* (2019.01)
*H01M 10/44* (2006.01)
*H01M 10/48* (2006.01)

(52) U.S. Cl.
CPC ......... *H01M 10/48* (2013.01); *B60L 2210/14* (2013.01); *H01M 2220/20* (2013.01)

(56) References Cited

FOREIGN PATENT DOCUMENTS

| | | | |
|---|---|---|---|
| JP | 2012111267 A | 6/2012 | |
| JP | 2012228918 A | 11/2012 | |
| JP | 2013095246 A | 5/2013 | |

* cited by examiner

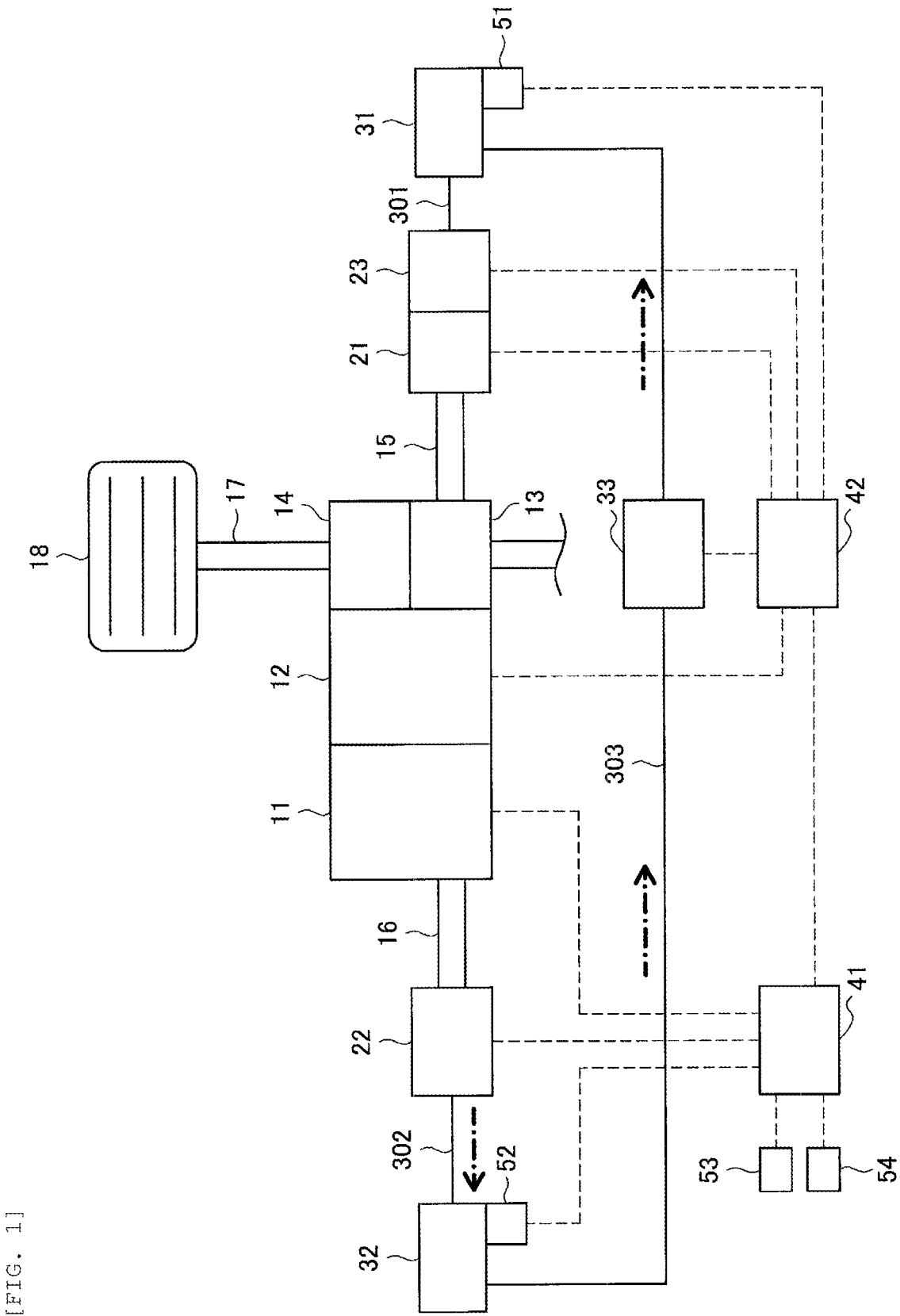
[FIG. 1]

[FIG. 2]
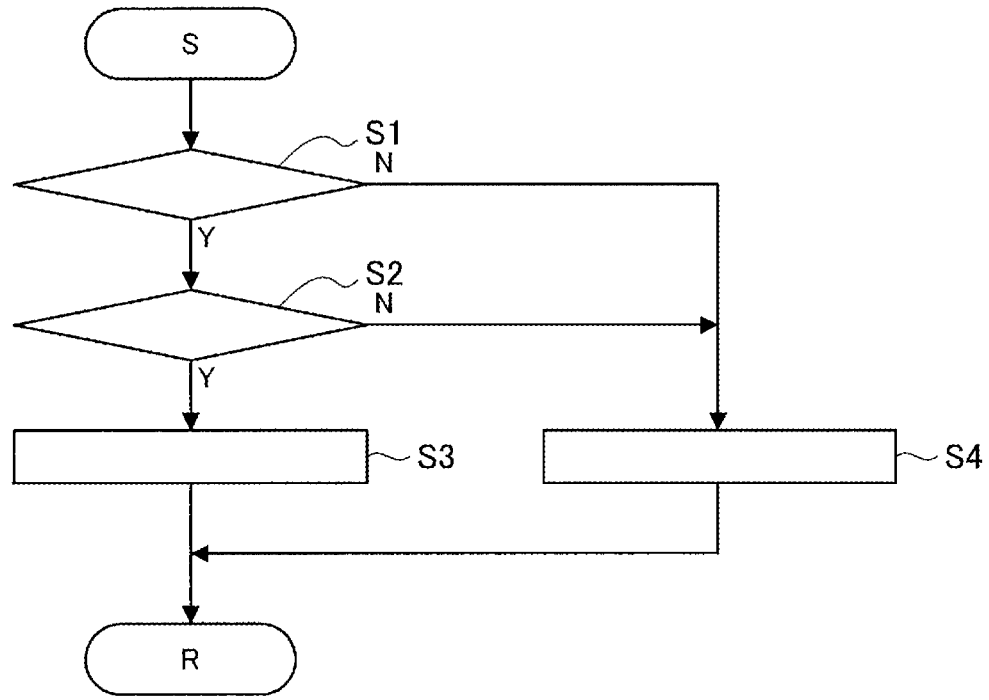
[FIG. 3]
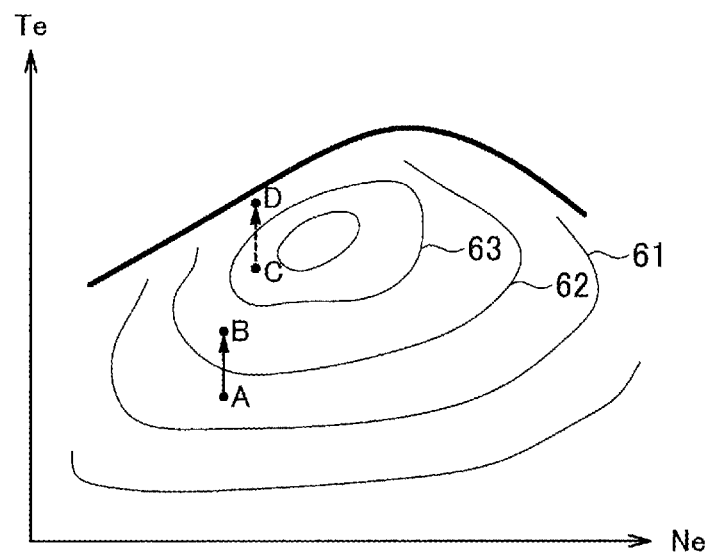

POWER CONTROL DEVICE AND POWER CONTROL METHOD FOR HYBRID VEHICLE

BACKGROUND OF THE INVENTION

The present invention relates to a device for controlling electric power of a hybrid vehicle.

Conventionally, a hybrid vehicle that includes: an internal combustion engine; a motor that can be coupled to a drive wheel of the vehicle; a generator that can be coupled to the internal combustion engine; a first secondary battery that is connected to the motor; a second secondary battery that is connected to the generator, and a voltage of which is lower than a voltage of the first secondary battery; and a converter that steps up a DC voltage received from the second secondary battery and outputs the stepped-up DC voltage to the first secondary battery has been known.

For example, in a hybrid vehicle disclosed in JP-A-2012-228918, a transmission is provided between the internal combustion engine and the drive wheel, and a clutch is provided between the internal combustion engine and the transmission. A power control device for this hybrid vehicle collects rotational energy of the internal combustion engine by the generator and stores the rotational energy in the second secondary battery in a period from disengagement between the internal combustion engine and the transmission to engagement therebetween again. Electrical energy of the second secondary battery can be increased by the converter and can be stored in the first secondary battery.

SUMMARY OF THE INVENTION

In the case where a charging rate of the second secondary battery is high, it is difficult to store power in the second secondary battery even when the internal combustion engine causes the generator to generate the power.

The present invention has been made in view of the above problem and therefore provides a power control device for a hybrid vehicle that allows a generator to generate electric power regardless of a charging rate of a second secondary battery.

According to an aspect of the present invention, a power control device for a hybrid vehicle is provided. The power control device is configured to supply electric power that is generated by a generator to a first secondary battery via a second secondary battery and a converter when a charging rate of the second secondary battery is equal to or higher than a specified value or when an increase rate of the charging rate of the second secondary battery is equal to or higher than a specified value.

Advantageous Effects of Invention

According to the present invention, the electric power can be generated by the generator regardless of the charging rate of the second secondary battery.

BRIEF DESCRIPTION OF THE DRAWINGS

FIG. 1 is a schematic view illustrating a configuration example of a hybrid vehicle in an embodiment of the present invention.

FIG. 2 is a flowchart illustrating control processing that is executed by a hybrid control unit in the embodiment.

FIG. 3 is a characteristic graph of an engine in the embodiment.

DETAILED DESCRIPTION

A detailed description will hereinafter be made on a preferred embodiment of the present invention with reference to the accompanying drawings. In the present specification and the drawings, components having the substantially same functional configurations will be denoted by the same reference signs, and a description thereon will not be repeated.

<1. Configuration Example of Hybrid Vehicle>

A description will firstly be made on a configuration example of a hybrid vehicle, to which a power control device in this embodiment is applied, with reference to FIG. 1. The hybrid vehicle has a drive system, a power supply system, and a control system.

The drive system has an engine 11, an automatic transmission 12, a transfer case 13, a differential mechanism 14, a first motor generator 21, and a second motor generator 22. The power supply system has: a high-voltage system including a first battery 31; a low-voltage system including a second battery 32; and a DC/DC converter 33. The control system has an engine control unit 41 and a hybrid control unit 42.

(Drive System)

The engine 11 is an internal combustion engine that uses gasoline, diesel fuel, or the like as fuel. When power that is generated by the engine 11 is transmitted to a wheel 18, drive power for the wheel 18 can be generated. The wheel 18 is a front wheel, for example, and functions as a drive wheel.

The automatic transmission 12 is provided in a power transmission path between the engine 11 and the wheel 18, changes a speed of output rotation from the engine 11, and transmits the output rotation to an axle 17 side. The automatic transmission 12 is a continuously variable transmission, for example, but may be a multistage transmission or the like. An output shaft of the automatic transmission 12 is coupled to the wheel 18 via a reduction gear, the differential mechanism 14, and the axle 17.

The first motor generator 21 is a three-phase AC rotary electric machine, for example, and is connected to the first battery 31 via an inverter 23. An output shaft 15 of the first motor generator 21 is coupled to the wheel 18 via the reduction gear, the differential mechanism 14, and the axle 17.

During motoring, the first motor generator 21 functions as a motor (a drive motor) that generates the power by using electric power supplied from the first battery 31 and generates the drive power for driving the wheel 18. During regeneration, the first motor generator 21 functions as a generator that is driven by the power transmitted from the wheel 18 side in conjunction with deceleration of the vehicle and generates the electric power.

The second motor generator 22 is a generator that is coupled to an output shaft 16 of the engine 11, and is connected to the second battery 32. The second motor generator 22 is also an alternator, can convert AC power, which is generated when the second motor generator 22 is rotationally driven by the engine 11, into DC power by a rectifier, and can supply the DC power to the second battery 32.

The second motor generator 22 may have a function as a starter motor for starting the engine 11. At this time, the second battery 32 can supply the electric power to the second motor generator 22 that functions as the motor.

The transfer case 13 is provided between the shaft on the output side of the automatic transmission 12 and the output shaft 15 of the first motor generator 21, and has a transfer gear and a transfer clutch. The transfer gear may be integrated with a gear of the differential mechanism 14. The transfer clutch is a friction element that is engaged or disengaged by a hydraulic pressure, for example, and may be provided between the output shaft 15 of the first motor generator 21 and the differential mechanism 14.

The transfer case 13 changes an engaged state of the transfer clutch so as to switch between allowance and prohibition of torque transmission between the first motor generator 21 and the axle 17. In the engaged state of the transfer clutch, the vehicle is brought into a hybrid travel mode in which, in addition to the power output from the engine 11, the power output from the first motor generator 21 is transmitted to the wheel 18 and the vehicle can be driven by both of the engine 11 and the first motor generator 21.

In the hybrid travel mode, the first motor generator 21 can also be driven by the power transmitted from the engine 11 side, and can generate the electric power. For example, in the case where there is a surplus of the output of the engine 11, the first motor generator 21 functions as the generator by using some of the power of the engine 11. In this way, energy efficiency of the engine 11 can be improved (see FIG. 3).

In a disengaged state of the transfer clutch, the vehicle is brought into an engine travel mode in which only the power output from the engine 11 is transmitted to the wheel 18 and the vehicle can be driven by the engine 11.

(Power Supply System)

The first battery 31 is a secondary battery at a relatively high voltage and is connected to the first motor generator 21 via a first power wire 301. The first battery 31 supplies the electric power to the first motor generator 21 when being discharged, and can also be charged when being supplied with the electric power generated by the first motor generator 21.

The inverter 23 converts the DC power supplied from the first battery 31 into the AC power, supplies the AC power to the first motor generator 21, and drives the first motor generator 21. In addition, the inverter 23 converts the AC power supplied from the first motor generator 21 into the DC power, supplies the DC power to the first battery 31, and charges the first battery 31.

The second battery 32 is a secondary battery at a lower voltage than that of the first battery 31 and is connected to the second motor generator 22 via a second power wire 302. The second battery 32 can be charged when being supplied with the electric power generated by the second motor generator 22. For example, the second battery 32 is connected to various electrical components of the vehicle and functions as a power supply thereof.

The DC/DC converter 33 is a converter that is provided to a third power wire 303 for connecting the first battery 31 and the second battery 32, and is connected to both of the batteries 31, 32. The DC/DC converter 33 is a bidirectional converter that has both of a step-up function and a step-down function, can step down a DC voltage received from the first battery 31 to output the stepped-down DC voltage to the second battery 32, and can also step up the DC voltage received from the second battery 32 to output the stepped-up DC voltage to the first battery 31.

(Control System)

Each of the engine control unit (ECU) 41 and the hybrid control unit (HCU) 42 may partially or entirely be constructed of a microcomputer, a microprocessor unit, or the like, for example. The microcomputer or the like may include: a central processing unit (CPU) that executes various types of arithmetic processing; read only memory (ROM) that stores various control programs; random access memory (RAM) that is used as a work area to store data and execute the programs; and input/output interfaces (I/O), and may have a general configuration in which these components are mutually connected by a bidirectional common bus. In addition, each of the control units may partially or entirely be constructed of a member in which firmware or the like can be updated, or may partially or entirely be a program module or the like that is executed by a command from the CPU or the like.

The ECU 41 and the HCU 42 are mutually connected in a manner to allow bidirectional communication via a communication line such as a controller area network (CAN), and bidirectionally communicates control information and various types of information pertaining to a control target.

The ECU 41 is connected to various actuators and sensors provided to the engine 11, an accelerator pedal position sensor 53, and a vehicle speed sensor 54 via communication lines. The accelerator pedal position sensor 53 detects an accelerator pedal position that is an operation amount of an accelerator pedal. The vehicle speed sensor 54 detects a rotational frequency of the axle 17 or the wheel 18, for example. The ECU 41 detects a speed of the vehicle (hereinafter a vehicle speed) on the basis of a signal from the vehicle speed sensor 54. The ECU 41 regulates a throttle valve opening degree, ignition timing, a fuel injection amount, and the like on the basis of signals received from the above sensors and the HCU 42, and can thereby control an operation state of the engine 11.

The ECU 41 is also connected, via communication lines, to the second motor generator 22 and a battery sensor 52 that is provided to the second battery 32. The battery sensor 52 detects and outputs a charging rate (SOC: a state of charge), charging history, a temperature, the voltage, a current, and the like of the second battery 32. The ECU 41 can control an actuation state of the second motor generator 22 on the basis of the signals received from the battery sensor 52 and the HCU 42.

In order to suppress overcharge and over-discharge of the second battery 32, the ECU 41 controls the actuation state of the second motor generator 22 on the basis of a speed of the engine 11 and the like, and thereby controls such that the charging rate SOC (hereinafter referred to as SOC2) of the second battery 32 fluctuates within a specified range, more specifically, between a specified upper limit value Amax2 and a specified lower limit value Amin2.

For example, when the SOC2 falls below the lower limit value Amin2, or when a magnitude (a rate) of a speed ASOC2 at which the SOC2 is reduced is equal to or higher than a specified upper limit value amax2, the second motor generator 22 increases a power generation amount or starts generating the electric power. When the SOC2 is equal to or higher than the upper limit value Amax2, or when the increase rate ASOC2 of the SOC2 is equal to or higher than the upper limit value amax2, the second motor generator 22 reduces the power generation amount or stops generating the electric power.

Even in the case where the SOC2 is equal to or higher than the upper limit value Amax2, or in the case where the increase rate ASOC2 of the SOC2 is equal to or higher than the upper limit value amax2, in a step-up mode of the DC/DC converter 33, which will be described below, the ECU 41 can cause the second motor generator 22 to generate the electric power and to supply the electric power to the second battery 32 according to the signal received from the HCU 42.

While achieving generation of requested drive power for the vehicle, the HCU 42 integrally controls the drive system and the power supply system so as to bring the vehicle into an optimum driving state from a perspective of energy efficiency of the entire vehicle.

The HCU 42 is connected, via communication lines, to the inverter 23, the first motor generator 21, and a battery sensor 51 that is provided to the first battery 31. The battery sensor 51 detects and outputs SOC (hereinafter referred to as SOC1) of the first battery 31 and the like. The HCU 42 outputs a command signal to the inverter 23 so as to control an actuation state of the first motor generator 21 on the basis of signals received from various sensors provided to the first motor generator 21 and the battery sensor 51.

In order to suppress overcharge and over-discharge of the first battery 31 while improving the energy efficiency, the HCU 42 controls the actuation state of the first motor generator 21, and thereby controls such that the SOC1 fluctuates within a specified range, more specifically, between a specified upper limit value Amax1 and a specified lower limit value Amin1.

The HCU 42 is connected to the automatic transmission 12 and the transfer case 13 via a communication line. The HCU 42 controls the operation state of the engine 11 and an actuation state of the automatic transmission 12 on the basis of information on the first battery 31, information such as the vehicle speed and the accelerator pedal position received from the ECU 41, and information from the automatic transmission 12. In addition, the HCU 42 controls an actuation state of the transfer case 13 on the basis of signals received from the ECU 41 and a sensor that detects a state of the transfer case 13, and controls engagement/disengagement of the transfer clutch, that is, switching of a travel mode.

For example, the HCU 42 calculates actuation points (the speed/rotational frequency or the torque) at which the engine 11 and the first motor generator 21 can be operated to generate the requested drive power in the current driving state (a battery state, the vehicle speed, and the like) of the vehicle. Then, the actuation states of the engine 11, the first motor generator 21, the automatic transmission 12, and the transfer case 13 are controlled such that a sum of consumed energy of the engine 11 and the first motor generator 21 is minimized.

The HCU 42 is also connected to the DC/DC converter 33 via a communication line. The HCU 42 controls an actuation state of the DC/DC converter 33 on the basis of the SOC2 received from the ECU 41 in addition to the SOC1.
(Flowchart)

FIG. 2 illustrates an example of a processing procedure for controlling the DC/DC converter 33 by the HCU 42. This processing is repeatedly executed in specified cycles.

In step S1, it is determined whether the SOC2 of the second battery 32 is equal to or higher than the upper limit value Amax2. If the SOC2 is equal to or higher than the upper limit value Amax2, the processing proceeds to step S2. If the SOC2 is lower than the upper limit value Amax2, the processing proceeds to step S4.

In step S2, it is determined whether the SOC1 of the first battery 31 is equal to or lower than the lower limit value Amin1. If the SOC1 is equal to or lower than the lower limit value Amin1, the processing proceeds to step S3. If the SOC1 exceeds the lower limit value Amin1, the processing proceeds to step S4.

In step S3, the DC/DC converter 33 is brought into the step-up mode. That is, the electric power (the DC voltage) of the second battery 32 is stepped up by the DC/DC converter 33 and is then supplied to the first battery 31 via the DC/DC converter 33. Thereafter, the current processing is terminated.

When bringing the DC/DC converter 33 into the step-up mode, the HCU 42 outputs the signal to the ECU 41, causes the second motor generator 22 to generate the electric power, and causes the second motor generator 22 to supply the electric power to the second battery 32. In other words, the power generation amount of the second motor generator 22 is not reduced, or the power generation by the second motor generator 22 is not stopped. At this time, the power generation amount of the second motor generator 22 may be adjusted according to the SOC1 or the like. Alternatively, the HCU 42 may be configured to directly control the actuation state of the second motor generator 22 without interposing the ECU 41.

In step S4, the DC/DC converter 33 is brought into an unactuated mode. That is, the DC/DC converter 33 is controlled such that the electric power of the first battery 31 is not output to the second battery 32 or that the electric power of the second battery 32 is not output to the first battery 31. Thereafter, the current processing is terminated.
<2. Significance of Each Technical Idea Grasped from this Embodiment>

As it has been described so far, the hybrid vehicle according to this embodiment has: the engine 11; the first motor generator 21 that can be coupled to the drive wheel 18 of the vehicle; the second motor generator 22 that can be coupled to the engine 11; the first battery 31 that is connected to the first motor generator 21; the second battery 32 that is connected to the second motor generator 22, and the voltage of which is lower than that of the first battery 31; and the DC/DC converter 33 that is connected to the first battery 31 and the second battery 32.

The first battery 31 can supply the electric power to the first motor generator 21. The first motor generator 21 can generate the drive power for the hybrid vehicle by being supplied with the electric power. The second motor generator 22 can generate the electric power when being driven by the engine 11. The second battery 32 can store the electric power that is generated by the second motor generator 22. The DC/DC converter 33 can step up the DC voltage received from the second battery 32 and can output the DC voltage to the first battery 31.

The HCU 42 functions as a device for controlling the electric power of such a hybrid vehicle.

When the charging rate SOC2 of the second battery 32 is equal to or higher than the specified upper limit value Amax2, the HCU 42 causes the second motor generator 22 to generate the electric power and brings the DC/DC converter 33 into the step-up mode (step S1-S3 in FIG. 2). In this way, the electric power that is generated by the second motor generator 22 is supplied to the first battery 31 via the second battery 32 and the DC/DC converter 33. As indicated by one-dot chain arrows in FIG. 1, while the electric power generated by the second motor generator 22 is supplied to the second battery 32, the electric power (the DC voltage) of the second battery 32 is stepped up by the DC/DC converter 33 and is supplied to the first battery 31.

Accordingly, a similar effect to an effect that can be exerted by practically eliminating a distinction between the first and second batteries 31, 32 and increasing charging capacity is obtained, and the second motor generator 22 can generate the electric power regardless of a magnitude of the SOC2. Even when the SOC2 is equal to or higher than the upper limit value Amax2, the second motor generator 22 can generate the electric power. In addition, even when such power generation is not suppressed, it is possible to avoid the overcharge of the second battery 32 and thus to improve durability of the second battery 32. Furthermore, the hybrid vehicle can use the electric power generated by the second motor generator 22. Thus, the energy efficiency of the hybrid vehicle can be improved. The above effect can be obtained without adding a battery. Thus, it is possible to prevent worsening of fuel consumption efficiency by suppressing weight of the vehicle.

The configuration of the drive system in the hybrid vehicle is not limited to that in this embodiment. For example, the first motor generator 21 only needs to have a function as the motor and may not have a function as the generator. The second motor generator 22 only needs to have a function as the generator and may not have a function as the motor.

The configuration between the engine 11 and the first motor generator 21 can be a given configuration. For example, the transfer clutch may be provided between the shaft on the output side of the automatic transmission 12 and the differential mechanism 14. In addition, a clutch may be provided between the engine 11 and the second motor generator 22. In summary, the drive system may have: the motor that can be coupled to the drive wheel of the vehicle; and the generator that can be coupled to the engine 11.

A threshold value for determining whether to bring the DC/DC converter 33 into the step-up mode (to cause the second motor generator 22 to generate the electric power) is not limited to the upper limit value Amax2 of the SOC2, but may be a given value B2 within a range that is larger than the lower limit value Amin2 of the SOC2 and smaller than the upper limit value Amax2. The value B2 can be determined according to a required electric power amount that the second battery 32 is requested to supply as the power supply of the various electrical components, for example.

As a condition for determining to bring the DC/DC converter 33 into the step-up mode (and cause the second motor generator 22 to generate the electric power), the HCU 42 may use a condition that the increase rate ASOC2 of the SOC2 is equal to or higher than a specified upper limit value bmax2 instead of or in addition to the condition that the SOC2 is equal to or higher than the above threshold value. That is, it only needs to determine whether the SOC2 becomes equal to or higher than the specified value or there is a high probability that the SOC2 becomes equal to or higher than the specified value.

When the SOC2 is lower than the upper limit value Amax2, the HCU 42 brings the DC/DC converter 33 into the unactuated mode (step S1-S4 in FIG. 2). That is, the DC/DC converter 33 is controlled such that the electric power of the second battery 32 is not output to the first battery 31. In this way, the reduction of the SOC2 is suppressed. Thus, it is possible to prevent the over-discharge of the second battery 32 in advance and to keep the second battery 32 in a state capable of supplying the requested electric power as the power supply of the various electrical components.

Here, when the SOC2 is lower than the upper limit value Amax2, the HCU 42 may bring the DC/DC converter 33 into a step-down mode. That is, the electric power (the DC voltage) of the first battery 31 may be stepped down by the DC/DC converter 33, and such electric power may be then supplied to the second battery 32 via the DC/DC converter 33.

A threshold value for determining whether to bring the DC/DC converter 33 into the unactuated mode or the step-down mode is not limited to the upper limit value Amax2 of the SOC2, but may be a given value C2 within a range that is larger than the lower limit value Amin2 of the SOC2 and smaller than the upper limit value Amax2. The value C2 can be determined according to the required electric power amount that the second battery 32 is requested to supply as the power supply of the various electrical components, for example.

In addition, as a condition for determining to bring the DC/DC converter 33 into the unactuated mode or the step-down mode as described above, the HCU 42 may use a condition that the reduction rate ASOC2 of the SOC2 is equal to or higher than a specified upper limit value cmax2 instead of or in addition to the condition that the SOC2 is lower than the above threshold value. That is, it only needs to determine whether the SOC2 becomes lower than the specified value or there is a high probability that the SOC2 becomes lower than the specified value.

When the charging rate SOC1 of the first battery 31 exceeds the lower limit value Amin1, the HCU 42 may cause the second motor generator 22 to generate the electric power and may bring the DC/DC converter 33 into the step-up mode. When the SOC1 is lower than the upper limit value Amax1, the first battery 31 can be charged. Thus, it is possible to supply the electric power generated by the second motor generator 22 to the first battery 31 via the second battery 32 and the DC/DC converter 33.

When the SOC1 is equal to or lower than the lower limit value Amin1, the HCU 42 in this embodiment causes the second motor generator 22 to generate the electric power and brings the DC/DC converter 33 into the step-up mode (step S2-S3 in FIG. 2). In this way, the electric power that is generated by the second motor generator 22 is supplied to the first battery 31 via the second battery 32 and the DC/DC converter 33.

Thus, it is possible to increase the generated electric power amount by the second motor generator 22 that is supplied to the first battery 31 and to improve the energy efficiency. In addition, when the first battery 31 is charged, and the SOC1 is increased to be higher than the lower limit value Amin1, the electric power of the first battery 31 can be used to drive the first motor generator 21. In this way, it is possible to extend a distance to empty of travel using the drive power of the first motor generator 21, for example, a distance to empty in a motor travel mode.

The threshold value for determining whether to bring the DC/DC converter 33 into the step-up mode as described above is not limited to the lower limit value Amin1 of the SOC1, but may be a given value B1 within a range that is larger than the lower limit value Amin1 of the SOC1 and smaller than the upper limit value Amax1. The value B1 can be determined according to a required electric power amount that the first battery 31 is requested to supply as the power supply of the first motor generator 21, for example.

In addition, as the condition for determining whether to bring the DC/DC converter 33 into the step-up mode as described above, the HCU 42 may use a condition that a reduction rate ASOC1 of the SOC1 is equal to or higher than a specified upper limit value amax1 instead of or in addition to the condition that the SOC1 is equal to or lower than the above threshold value. That is, it only needs to determine whether the SOC1 becomes equal to or lower than the specified value or there is a high probability that the SOC1 becomes equal to or lower than the specified value.

Furthermore, when determining that the SOC1 exceeds the specified value such as the upper limit value Amax1 or that there is the high possibility that the SOC1 exceeds the specified value, the HCU 42 may bring the DC/DC converter 33 into the unactuated mode or the step-down mode. That is, the electric power of the second battery 32 may not be output to the first battery 31, or the electric power (the DC voltage) of the first battery 31 may be stepped down by the DC/DC converter 33, so as to supply such electric power to the second battery 32 via the DC/DC converter 33. In this way, it is possible to prevent the overcharge of the first battery 31 and to improve durability of the first battery 31.

When an operation point of the engine 11 is in a range where the energy efficiency of the engine 11 is lower than a first specified value, the HCU 42 may cause the second motor generator 22 to generate the electric power and may bring the DC/DC converter 33 into the step-up mode. In this way, the electric power generated by the second motor generator 22 may be supplied to the first battery 31 via the second battery 32 and the DC/DC converter 33. Alternatively, when the operation point of the engine 11 is in a range where the energy efficiency of the engine 11 is equal to or higher than a second specified value, the power generation amount of the second motor generator 22 may be reduced, or the power generation by the second motor generator 22 may be stopped. In these cases, it is possible to improve the energy efficiency of the engine 11. Hereinafter, a description will be made with reference to FIG. 3.

FIG. 3 illustrates an example of a characteristic of the engine 11 that is defined by output torque Te and a speed Ne as the operation point of the engine 11. Points at which a fuel consumption rate as the energy efficiency of the engine 11 is the same are connected by a level line (a level fuel consumption line) that is indicated by a thin solid line. For example, a range on a level fuel consumption line 61 side from a level fuel consumption line 62 is a relatively low-load range. In such a range, the energy efficiency of the engine 11 is lower than the first specified value. When the operation point of the engine 11 is located at a point A in this range, the second motor generator 22 generates the electric power. In order for such power generation, the engine 11 has to drive the second motor generator 22. Due to this load, the operation point of the engine 11 possibly moves from the point A to a point B in a range that is on a level fuel consumption line 63 side from the level fuel consumption line 62 and where the energy efficiency of the engine 11 is equal to or higher than the first specified value. When the DC/DC converter 33 is brought into the step-up mode to enable the above power generation, it is possible to promote the above transition in the operation point of the engine 11.

Meanwhile, when the operation point of the engine 11 is in a range (for example, a point C in FIG. 3) where the energy efficiency is equal to or higher than the second specified value, an increase in the load of the engine 11 may be suppressed. For example, when the DC/DC converter 33 is brought into the unactuated mode or the step-down mode, the power generation by the second motor generator 22 is suppressed in comparison with the step-up mode. Thus, the increase in the load of the engine 11 is suppressed. In this way, it is possible to suppress the operation point of the engine 11 from moving to a range (for example, a point D) where the energy efficiency is lower than the second specified value.

When calculating an actuation point (the speed or the torque) at which the engine 11 can be operated to generate the requested drive power, the HCU 42 may calculate the above actuation point at which the engine 11 can be operated according to the actuation state of the second motor generator 22. For example, in the case where the power generation by the second motor generator 22 is suppressed at the time of calculating a maximum value or a minimum value of the torque that can be output by the engine 11, the load of the engine 11 caused by driving the second motor generator 22 is set to a specified value during no-power generation. When the second motor generator 22 generates the electric power, the above load of the engine 11 is set to a value that corresponds to the power generation amount, for example. In this way, it is possible to further accurately calculate the actuation point at which the engine 11 can be operated. Thus, it is possible to further effectively reduce the sum of the consumed energy by the engine 11 and the first motor generator 21.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

REFERENCE SIGNS LIST

11: Engine
18: Wheel
21: First motor generator
22: Second motor generator
31: First battery
32: Second battery
33: DC/DC converter
42: Hybrid control unit

The invention claimed is:

1. A device (42) for controlling electric power of a hybrid vehicle, the power control device (42) comprising:
    an internal combustion engine (11);
    a motor (21) that can be coupled to a drive wheel (18) of the vehicle;
    a generator (22) that can be coupled to the internal combustion engine (11);
    a first secondary battery (31) that is connected to the motor (21);
    a second secondary battery (32) that is connected to the generator (22), and a voltage of which is lower than that of the first secondary battery (31); and
    a converter (33) that is connected to the first secondary battery (31) and the second secondary battery (32), steps up a DC voltage received from the second secondary battery (32), and can output the stepped-up DC voltage to the first secondary battery (31), wherein
    the power control device (42) of the hybrid vehicle is configured to supply electric power that is generated by the generator (22) to the first secondary battery (31) via the second secondary battery (32) and the converter (33) when a charging rate (SOC2) of the second secondary battery (32) is equal to or higher than a specified value or when an increase rate of the charging rate (SOC2) of the second secondary battery (32) is equal to or higher than a specified value.

2. The power control device (42) of the hybrid vehicle according to claim 1 being configured to
    supply the electric power that is generated by the generator (22) to the first secondary battery (31) via the second secondary battery (32) and the converter (33) when an operation point of the internal combustion engine (11) is in a range where energy efficiency of the internal combustion engine (11) is lower than a specified value.

3. The power control device (42) of the hybrid vehicle according to claim 1 or 2 being configured to
supply the electric power that is generated by the generator (22) to the first secondary battery (31) via the second secondary battery (32) and the converter (33) when a charging rate (SOC1) of the first secondary battery (31) is equal to or lower than a specified value or when a reduction rate of the charging rate (SOC1) of the first secondary battery (31) is equal to or higher than a specified value.

4. The power control device (42) of the hybrid vehicle according to any one of claims 1 to 3 being configured to
control the converter (33) in a manner not to output electric power of the second secondary battery (32) to the first secondary battery (31) when the charging rate (SOC2) of the second secondary battery (32) is lower than the specified value or when a reduction rate of the charging rate (SOC2) of the second secondary battery (32) is equal to or higher than a specified value.

5. A method for controlling electric power of a hybrid vehicle including:
an internal combustion engine (11);
a motor (21) that can generate drive power of the vehicle when being supplied with the electric power;
a generator (22) that is driven by the internal combustion engine (11) and can generate the electric power;
a first secondary battery (31) that can supply the electric power to the motor (21);
a second secondary battery (32) that can be charged with the electric power generated by the generator (22), and a voltage of which is lower than that of the first secondary battery (31); and
a converter (33) that steps up a DC voltage received from the second secondary battery (32) and can output the stepped-up DC voltage to the first secondary battery (31),
the power control method for the hybrid vehicle comprising:
supplying the electric power that is generated by the generator (22) to the first secondary battery (31) via the second secondary battery (32) and the converter (33) when a charging rate (SOC2) of the second secondary battery (32) is equal to or higher than a specified value or when an increase rate of the charging rate (SOC2) of the second secondary battery (32) is equal to or higher than a specified value.

* * * * *